United States Patent
Harris et al.

(12)

(10) Patent No.: US 6,189,581 B1
(45) Date of Patent: Feb. 20, 2001

(54) FILLER NECK CLOSURE

(75) Inventors: Robert S. Harris, Connersville; Jason K. Jobe, Glenwood, both of IN (US)

(73) Assignee: Stant Manufacturing Inc., Connersville, IN (US)

(*) Notice: Under 35 U.S.C. 154(b), the term of this patent shall be extended for 0 days.

(21) Appl. No.: 09/306,857

(22) Filed: May 7, 1999

Related U.S. Application Data

(60) Provisional application No. 60/084,730, filed on May 8, 1998.

(51) Int. Cl.[7] ................. B65B 1/04; B65B 3/00; B67C 3/00
(52) U.S. Cl. ............ 141/348; 141/307; 141/312; 141/326; 220/86.2; 220/746; 137/588
(58) Field of Search .................. 141/44, 45, 59, 141/86, 285, 286, 290, 301, 302, 307, 312, 325–327, 348–350, 368–371, 375; 220/86.2, 746; 137/587, 588, 589

(56) References Cited

U.S. PATENT DOCUMENTS

| | | |
|---|---|---|
| 4,977,936 | 12/1990 | Thompson et al. . |
| 4,986,439 | 1/1991 | Ott et al. . |
| 5,056,570 | 10/1991 | Harris et al. . |
| 5,195,566 | 3/1993 | Ott et al. . |
| 5,271,438 | 12/1993 | Griffin et al. . |
| 5,322,100 * | 6/1994 | Buechler et al. ............... 141/312 |
| 5,730,194 | 3/1998 | Foltz . |
| 5,732,840 | 3/1998 | Foltz . |
| 5,865,222 * | 2/1999 | Diamond ......................... 141/86 |

FOREIGN PATENT DOCUMENTS

| | | |
|---|---|---|
| 42 18 287 A1 | 12/1993 | (DE) . |
| 0 887 219 A1 | 12/1998 | (EP) . |

* cited by examiner

*Primary Examiner*—Timothy L. Maust
(74) *Attorney, Agent, or Firm*—Barnes & Thornburg

(57) ABSTRACT

A fuel tank filler apparatus includes a fuel tank filler neck, a pressure-relief valve coupled to the fuel tank filler neck, and a filler neck closure coupled to the fuel tank filler neck. The filler neck closure includes a drainage basin configured to collect liquid fuel, a retention chamber configured to store liquid fuel, and a fuel conductor configured to communicate liquid fuel between the drainage basin and the retention chamber. The filler neck closure can also include a blocker positioned to pivot about a pivot axis between a normally closed position blocking a fuel-receiving passage and an opened position permitting liquid fuel to flow through the fuel-receiving passage to the fuel tank.

60 Claims, 7 Drawing Sheets

FILLER NECK CLOSURE

This application claims priority under U.S.C. §119 (e) to U.S. Provisional Application No. 60/084,730, filed May 8, 1998, which is expressly incorporated by reference herein.

BACKGROUND AND SUMMARY OF THE INVENTION

The present invention relates to a filler neck closure for a tank filler neck.

More particularly, the present invention relates to a closure that permits a fuel-dispensing nozzle to be inserted into a tank filler neck to supply fuel to a fuel tank and closes the tank filler neck when the fuel-dispensing nozzle is removed from the closure.

Many vehicles include fuel tanks, tank filler necks coupled to the fuel tank to communicate liquid fuel from a fuel-dispensing nozzle to the fuel tank, and a filler neck closure coupled to the fuel tank filler neck to seal the fuel tank filler neck. During refueling, the fuel-dispensing nozzle is positioned in the fuel tank filler neck and liquid fuel is introduced therein by the fuel-dispensing nozzle. Then, the fuel tank filler neck communicates the liquid fuel to the fuel tank. During refueling, a portion of the liquid fuel can be trapped in the filler neck and not communicated to the fuel tank. During the next refueling, this liquid fuel can be forced out of the filler neck and vehicle by pressurized fuel vapor exiting the filler neck from the fuel tank.

According to the present invention, a fuel tank filler apparatus is provided including a fuel tank filler neck and a filler neck closure coupled to the fuel tank filler neck. The fuel tank filler neck is adapted to receive a fuel-dispensing nozzle introducing liquid fuel therein and to communicate the liquid fuel to a fuel tank. The filler neck closure includes a drainage basin configured to collect liquid fuel, a retention chamber configured to store liquid fuel, and a fuel conductor configured to communicate liquid fuel between the drainage basin and the retention chamber.

In preferred embodiments, the conductor provides means for conducting liquid fuel from the drainage basin to the retention chamber after removal of the fuel-dispensing nozzle from the fuel tank filler neck so that liquid fuel not introduced to the fuel tank is stored in a location separate from the drainage basin. Furthermore, the conductor provides means for conducting liquid fuel from the retention chamber to the fuel tank using negative pressure created during introduction of liquid fuel into the fuel tank filler neck by the fuel-dispensing nozzle so that liquid fuel stored in the retention chamber is communicated to the fuel tank. Thus, the conductor provides means for communicating liquid fuel to the retention chamber after removal of the fuel-dispensing nozzle from the fuel tank filler neck so that liquid fuel not introduced to the fuel tank is stored in the retention chamber at a location separate from the drainage basin and aspirating the liquid fuel stored in the retention chamber to the filler neck using negative pressure created during introduction of liquid fuel into the fuel tank filler neck by the fuel-dispensing nozzle so that liquid fuel stored in the retention chamber is communicated to the fuel tank. Filler neck closure further includes an inlet into the retention chamber configured to introduce liquid fuel into the retention chamber. The inlet is spaced apart from the fuel conductor.

Additional features of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
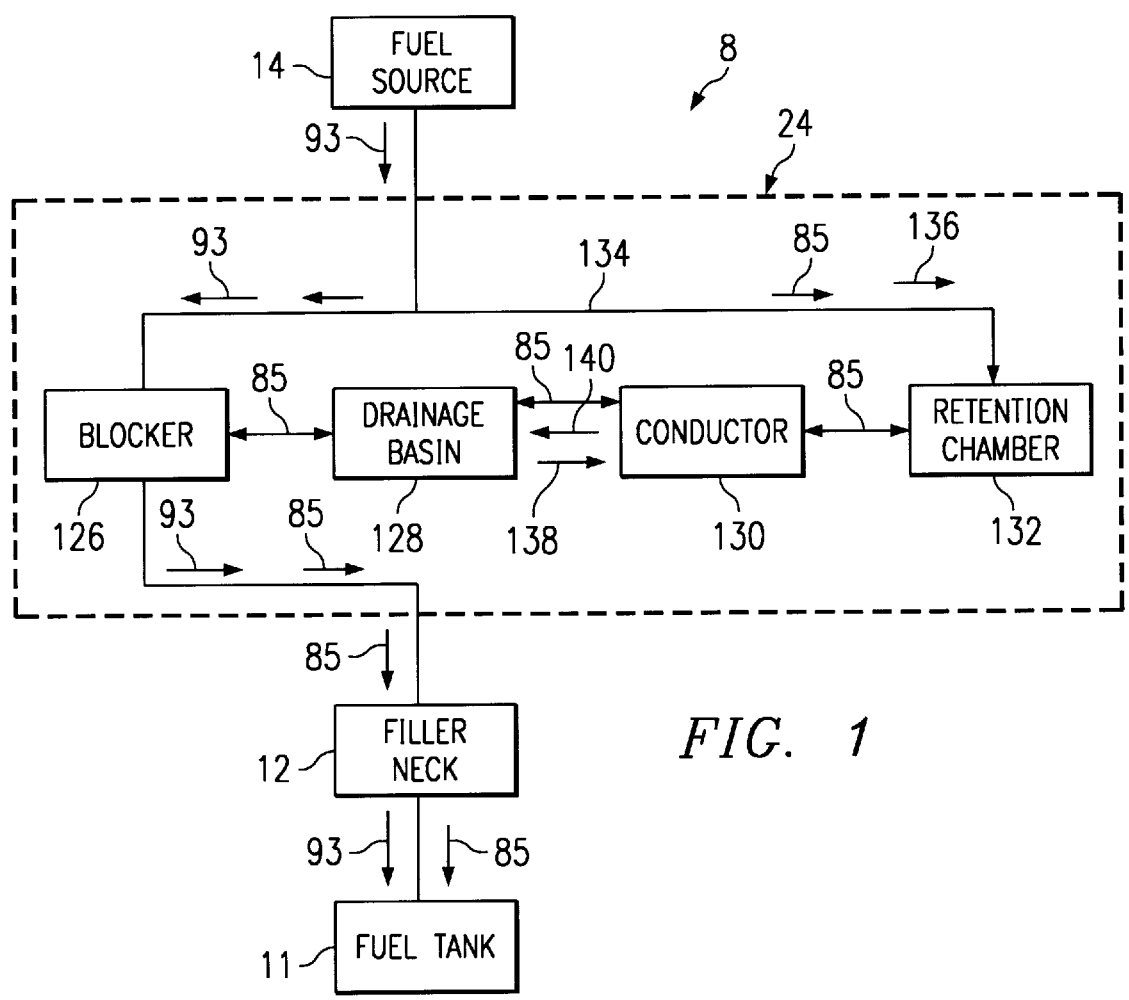
FIG. 1 is a diagrammatic view of a fuel system showing the fuel system includes a fuel tank, a filler neck coupled to the fuel tank, a filler neck closure (shown as a dashed box), and a fuel-dispensing nozzle or fuel source introducing liquid fuel into the fuel tank through the filler neck and filler neck closure, the filler neck closure including a blocker, a drainage basin, a retention chamber, and a conductor positioned between the drainage basin and the retention chamber, the blocker being positioned to move between a closed position blocking the flow of liquid fuel and fuel vapor through the closure, the drainage basin collecting liquid fuel that enters the filler neck closure and is not communicated to the fuel tank, the conductor communicating liquid fuel from the drainage basin to the retention chamber where it is stored, and during refueling, the liquid fuel stored in the retention chamber being aspirated through the conductor to the filler neck and fuel tank.

FIG. 1 is a diagrammatic view of a fuel system 8 including a fuel tank 11, a fuel tank filler neck 12 coupled to fuel tank 11, a filler neck closure 24 coupled to fuel tank filler neck 12, and a fuel source or fuel-dispensing nozzle 14. Fuel-dispensing nozzle 14 extends through closure 24 to supply liquid fuel 93 to fuel tank 11 through filler neck 12. Filler neck closure 24 includes a blocker 126, a drainage basin 128, a conductor 130, a fuel retention chamber 132, and a fuel retention chamber inlet 134. Blocker 126 is movable between an opened position permitting liquid fuel 93 to flow through closure 24 and a closed position blocking liquid fuel 93 from flowing through closure 24.

If fuel-dispensing nozzle 14 provides liquid fuel 85 when blocker 126 seals closure 24, liquid fuel 85 introduced into inlet 134 is moved in direction 136 into fuel retention chamber 132 and liquid fuel 85 collected in drainage basin 128 is moved in direction 138 by conductor 130 into fuel retention chamber 132. Liquid fuel 85 is stored in retention chamber 132 until fuel-dispensing nozzle 14 extends through or otherwise breaks the seal of closure 24 provided by blocker 126. At some point after the seal of closure 24 is broken, conductor 130 communicates liquid fuel 85 in direction 140 from fuel retention chamber 132 into filler neck 12.

Figure 2:
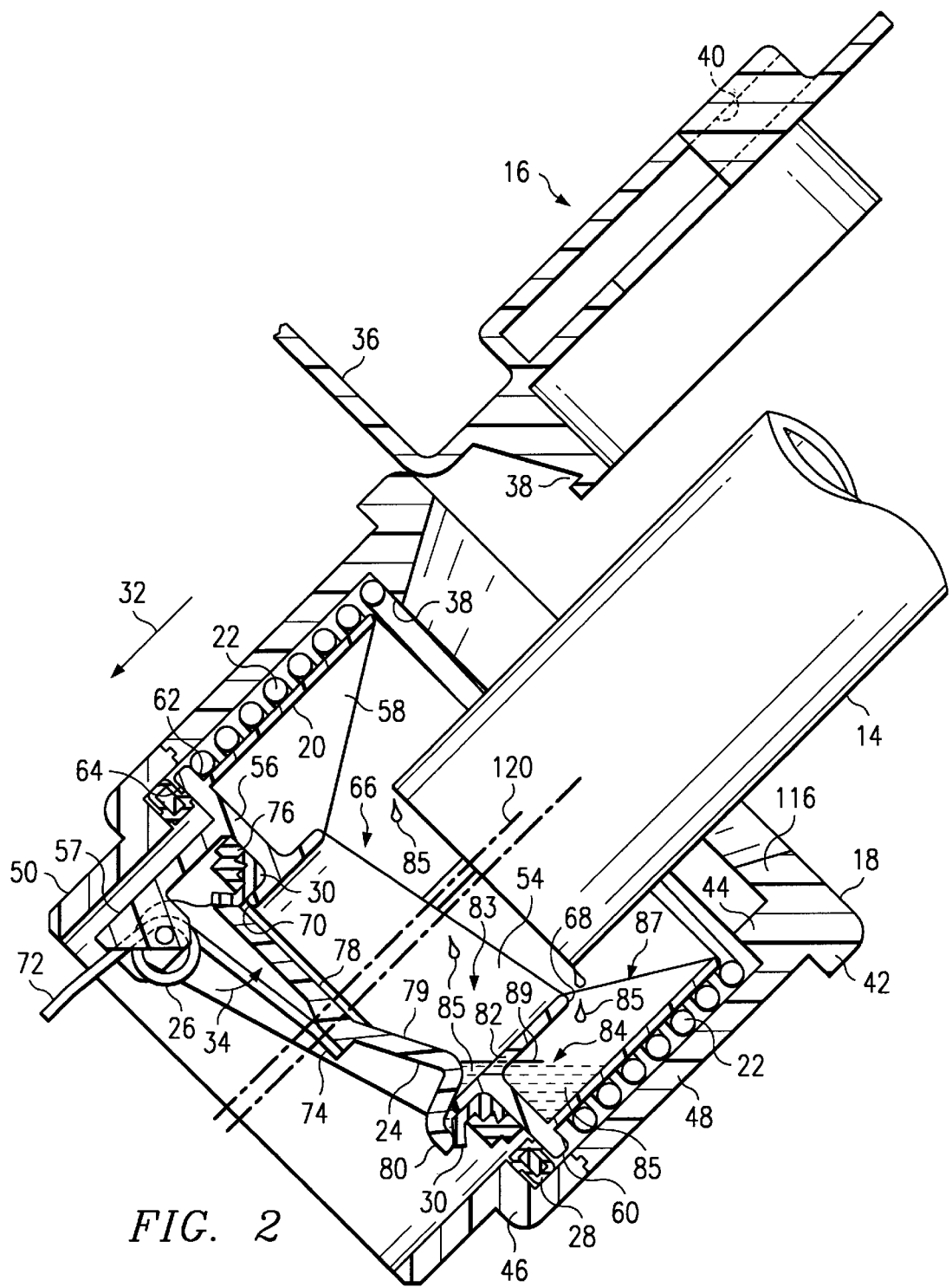
FIG. 2 is a sectional view of a preferred embodiment filler neck closure showing a fuel-dispensing nozzle being drawn out of the fuel tank filler neck at the completion of refueling and droplets of liquid fuel being trapped in the closure, the closure including a drainage basin, a tube-shaped nozzle guide including a drain hole, and a retention chamber, the drainage basin capturing this liquid fuel and directing said liquid fuel to the drain hole which communicates the liquid fuel to the retention chamber.
Figure 4:
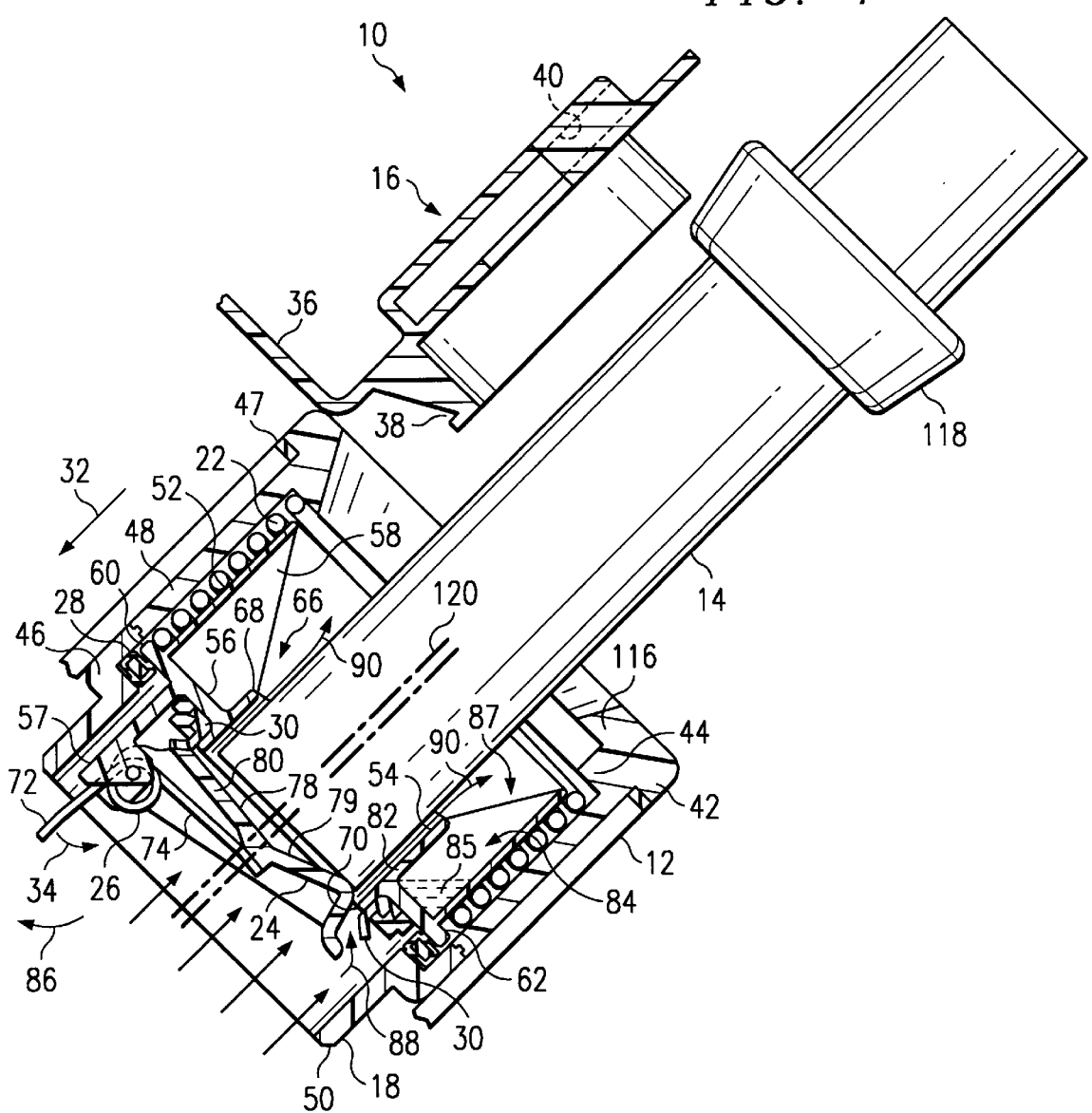
FIG. 4 is a sectional view of the filler neck closure of FIG. 2 showing the closure positioned to lie within a fuel tank filler neck, the fuel-dispensing nozzle extending into the nozzle guide and opening a door so that fuel vapors are permitted to escape through the closure between the fuel-dispensing nozzle and nozzle guide, and the liquid fuel stored in the retention chamber remaining therein.
Figure 5:
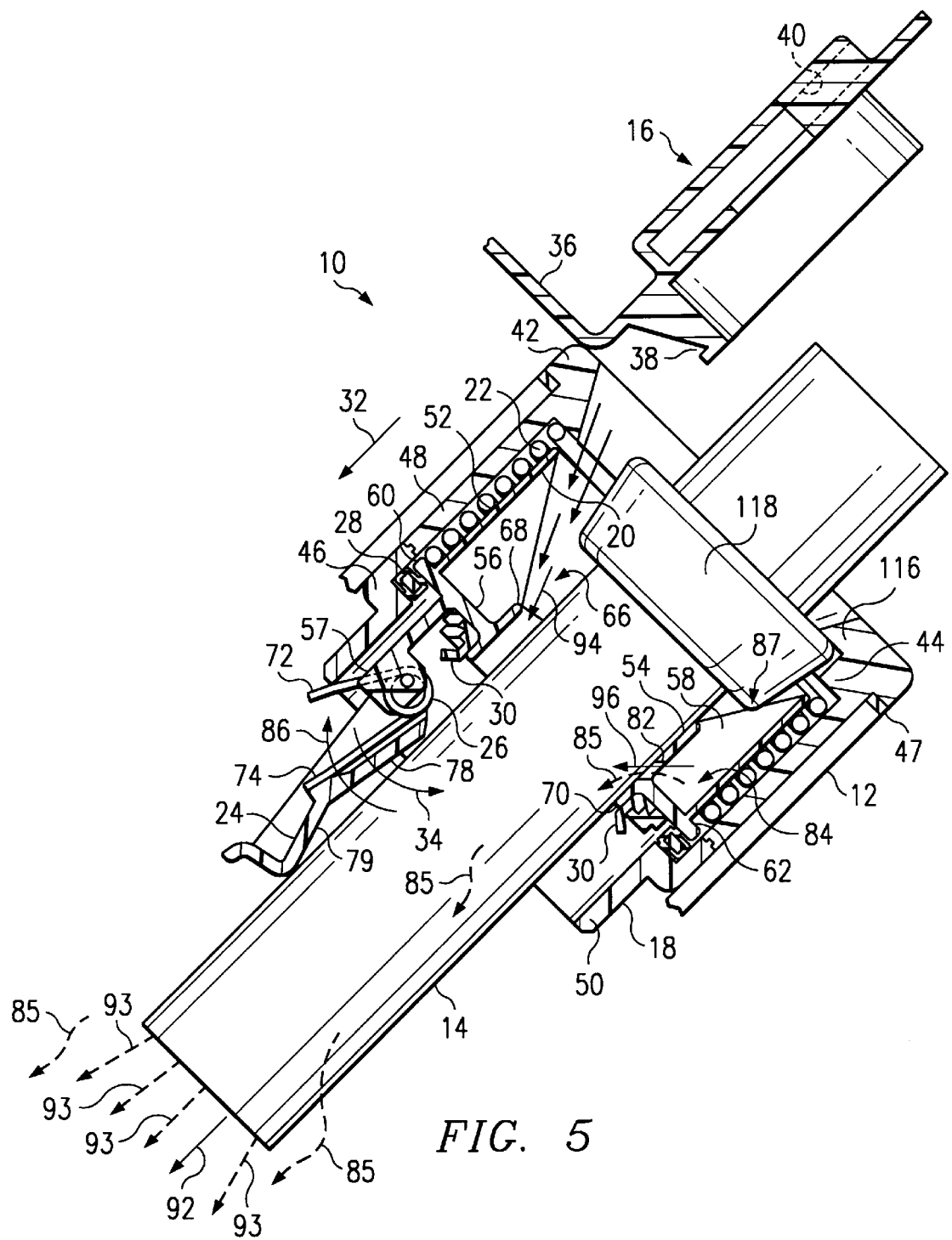
FIG. 5 is a sectional view of the filler neck closure similar to FIG. 2 showing the fuel-dispensing nozzle extending past the door and farther into the tank filler neck, the fuel-dispensing nozzle dispensing liquid fuel into the tank filler neck, and air flowing into the tank filler neck between the nozzle guide and fuel-dispensing nozzle so that the liquid fuel retained in the retention chamber is aspirated into the tank filler neck and fuel tank (not shown)
Figure 6:
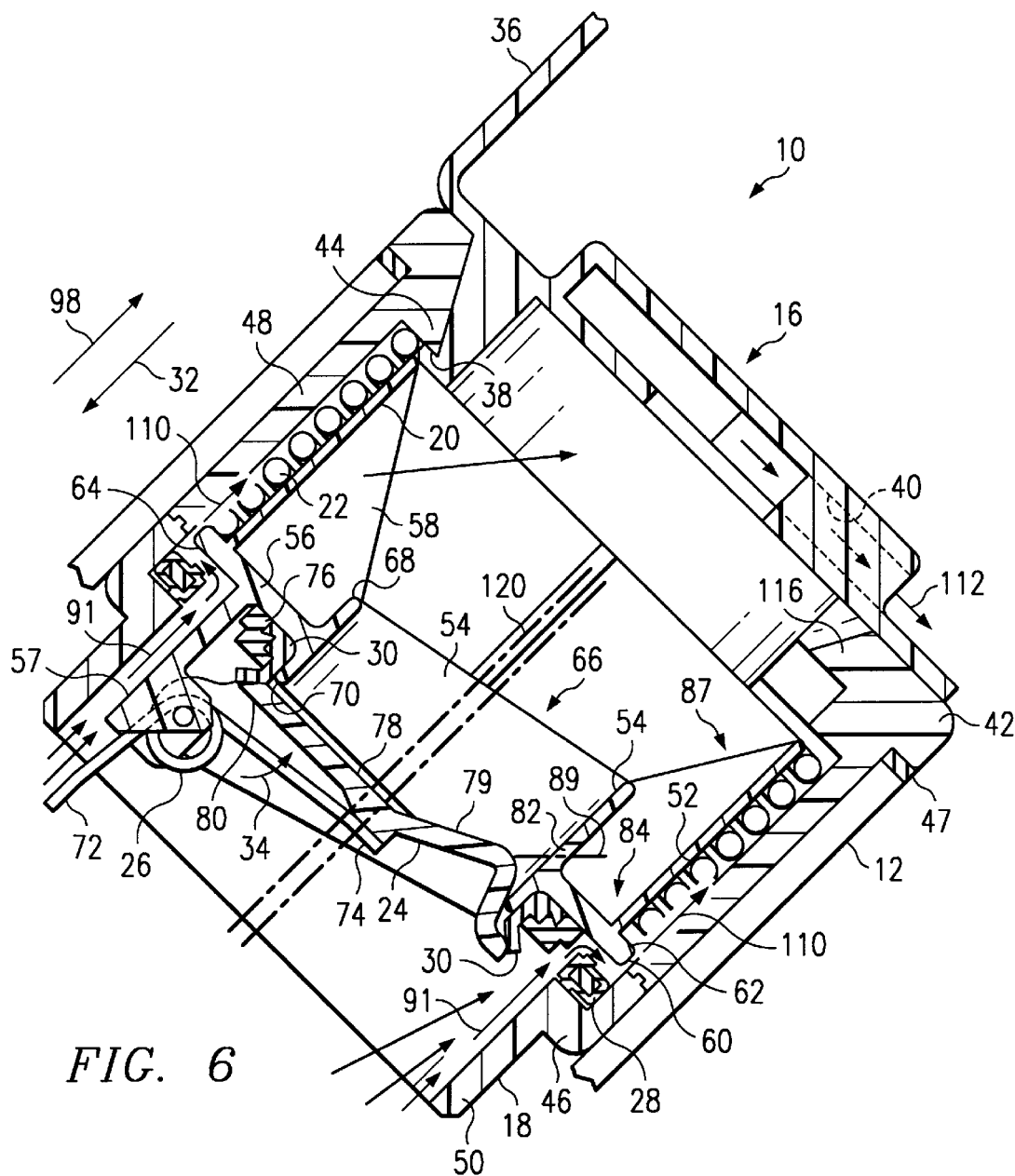
FIG. 6 is a sectional view of the filler neck closure similar to FIG. 2 showing excess pressurized fuel vapor being vented out of the filler neck closure.
Figure 7:
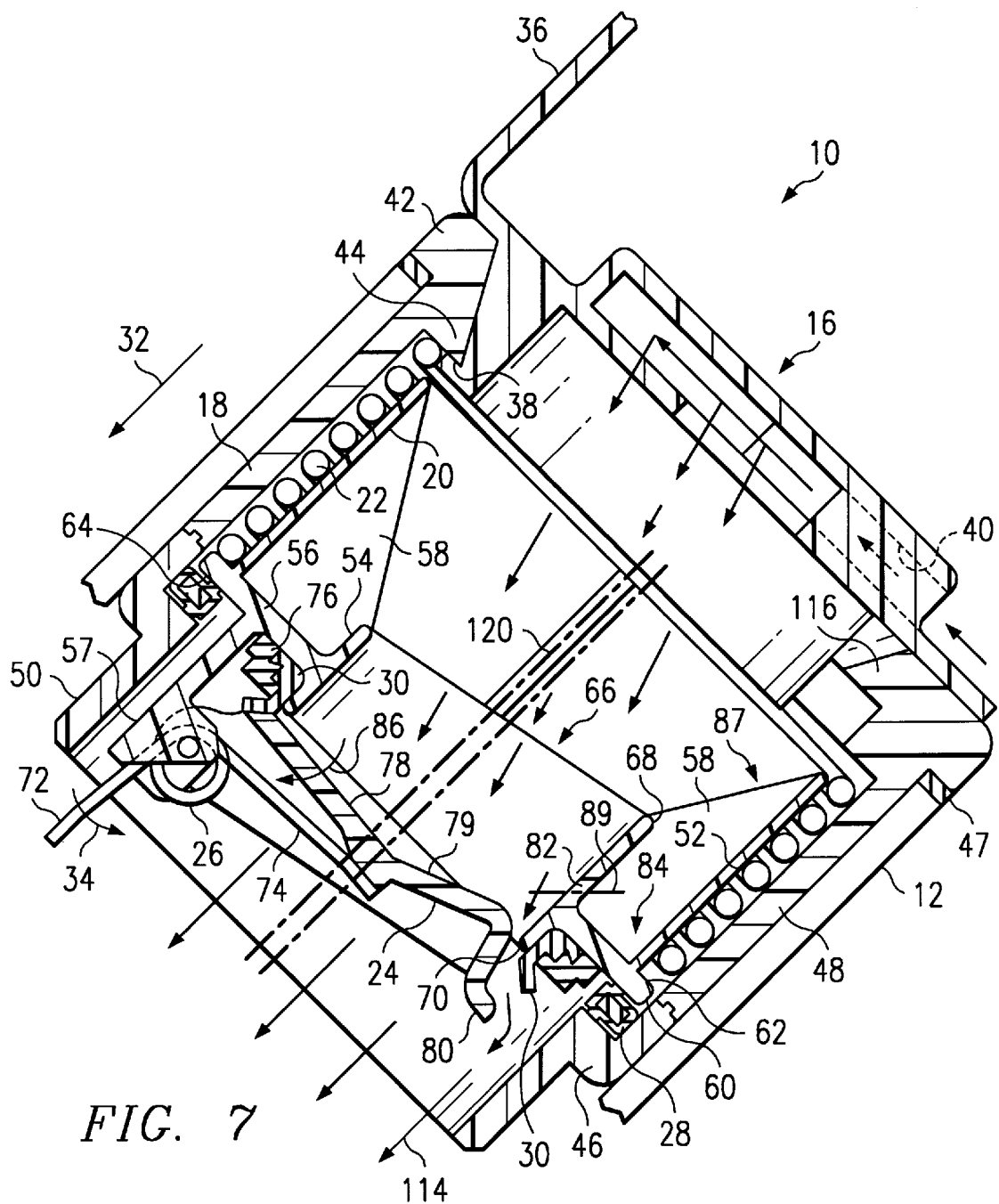
FIG. 7 is a sectional view of the filler neck closure similar to FIG. 2 showing ambient air flowing into the filler neck closure and tank filler neck to raise the pressure in the tank filler neck.

A preferred embodiment filler neck closure 10 is provided for use in vehicle fuel tank filler neck 12 as shown in FIG. 2. Filler neck closure 10 closes and seals filler neck 12 except when fuel-dispensing nozzle or fuel source 14 is inserted into filler neck closure 10 to provide liquid fuel 93 for the vehicle as shown in FIGS. 2, 4, and 5. Filler neck closure 10 also permits pressurized fuel vapor 91 within filler neck 12 to equalize with ambient air pressure within predetermined positive and negative pressure limits as shown in FIGS. 6 and 7.

Filler neck closure 10 includes a cover 16, an outer housing 18, a cup-shaped seal plate 20, a compression spring 22, a door 24, a torsion spring 26, and first and second seals 28, 30 as shown in FIGS. 2–7. Filler neck closure 10 seals and closes filler neck 12 by compression spring 22 biasing seal plate 20 downward in direction 32 into engagement with first seal 28 and torsion spring 26 biasing door 24 upward in direction 34 against second seal 30.

Cover 16 is not intended to seal filler neck 12 but rather is intended to prevent foreign objects from entering filler neck 12. Cover 16 includes a tether 36, an outer housing-engaging detent 38, and a vent 40. Tether 36 is coupled to the body (not shown) of a vehicle (not shown). In alternative embodiments, the cover does not need to include a tether.

Outer housing 18 engages filler neck 12 and is configured to receive and house cup-shaped seal plate 20, compression spring 22, door 24, and torsion spring 26. In the illustrated embodiment, outer housing 18 slides into filler neck 12 so that filler neck 12 may be crimped onto filler neck closure 10. In alternative embodiments, the outer housing may be coupled to the filler neck in any manner including a threaded connection.

Outer housing 18 includes an outwardly-extending shoulder 42, a lip 44, and an upwardly-facing shoulder 46. A seal 47 is positioned to lie between the top of filler neck 12 and outwardly-extending shoulder 42 as shown in FIGS. 2–7. Detent 38 of cover 16 snaps underneath lip 44 to secure cover 16 over and within outer housing 18. In preferred embodiments, detent 34 extends approximately 250 degrees about an axis 120.

In the illustrated embodiment, outer housing 18 is a two-piece outer housing 18 and includes an upper portion 48 and a lower portion 50. In alternative embodiments, the outer housing may be of one piece or multiple pieces.

Cup-shaped seal plate 20 is positioned to lie within outer housing 18 as shown in FIGS. 2–7. Seal plate 20 includes a cylindrical outer wall 52, a tube-shaped nozzle guide 54, a bottom wall 56 extending between outer wall 52 and nozzle guide 54, a torsion spring support 57 coupled to bottom wall 56, and spaced-apart ribs 58 extending between outer wall 52, nozzle guide 54, and bottom wall 56. Bottom wall 56 extends past outer wall 52 and includes a sealing lip 60.

Compression spring 22 is positioned to lie between outer housing 18 and outer side wall 52 of seal plate 18. Sealing lip 60 includes a top side 62 facing upwardly toward and engaging compression spring 22 and a bottom side 64 facing downwardly toward and configured to engage first seal 28. Compression spring 22 extends between and engages top side 62 of sealing lip 60 and lip 44 of outer housing 16 as shown in FIGS. 2–7.

Compression spring 22 biases seal plate 20 downwardly in direction 32 so that bottom side 64 of sealing lip 60 engages and seals against first seal 28. First seal 28 is coupled to upwardly-facing shoulder 46 of outer housing 18. Compression spring 22, seal plate 20, and outer housing 18 cooperate to function as a pressure-relief valve as described below.

Figure 3:
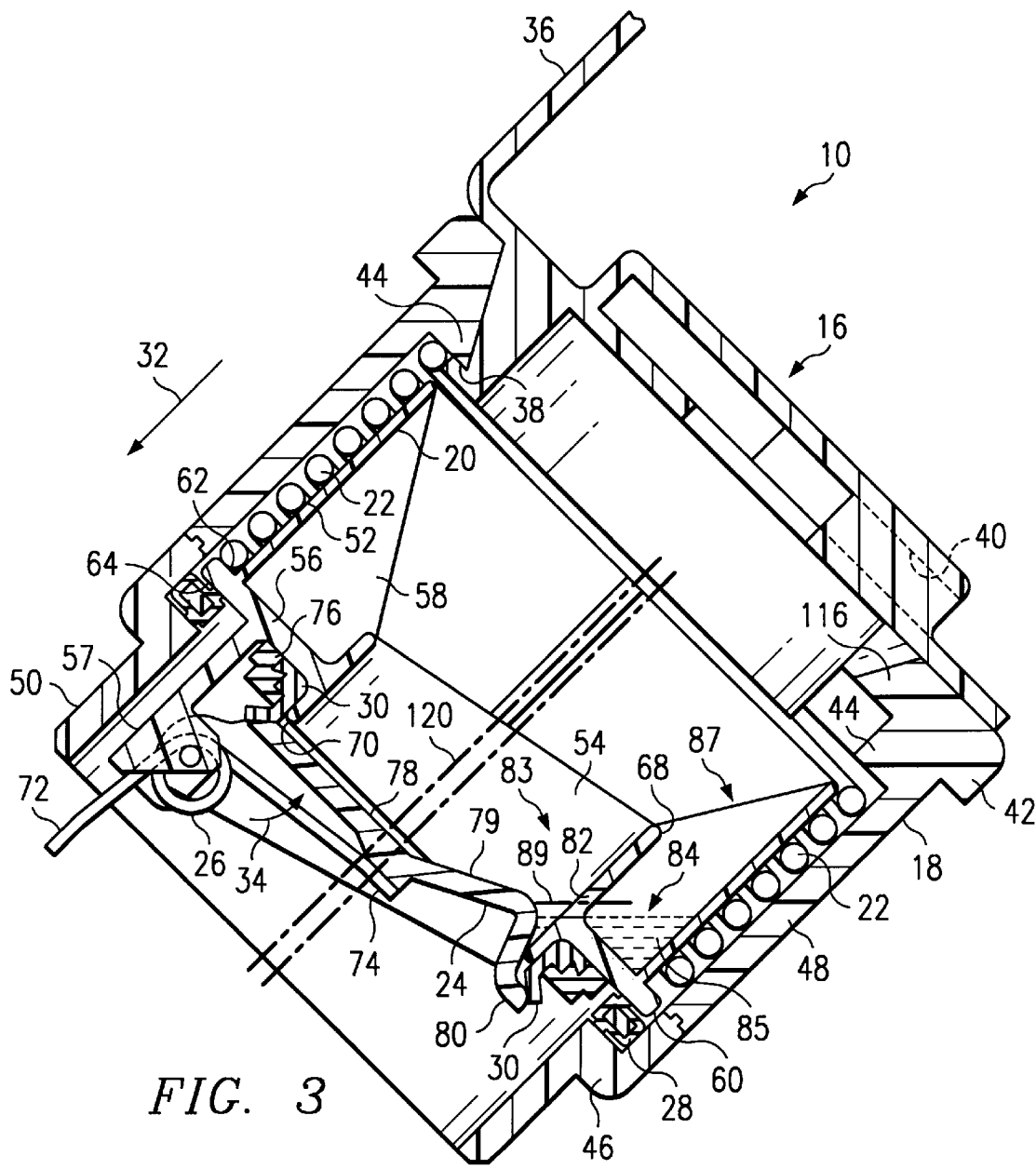
FIG. 3 is a sectional view of the filler neck closure similar to FIG. 2 showing liquid fuel trapped in the retention chamber defined by the tube-shaped nozzle guide and a cup-shaped seal plate arranged to surround the nozzle guide.

Nozzle guide 54 is generally cylindrical shaped and defines a fuel-receiving passage 66 through which a fuel-dispensing nozzle 14 is inserted as shown in FIGS. 2 and 3. Nozzle guide 54 includes spaced-apart top and bottom sides 68, 70. Top side 68 is positioned to lie above bottom wall 56 between bottom wall 56 and cover 16. Bottom side 70 is positioned to lie below bottom wall 56 so that bottom wall 56 is between top side 68 and bottom side 70. Ribs 58 guide fuel-dispensing nozzle 14 through filler neck closure 10 into fuel-receiving passage 66.

Door 24 is rotatably coupled to bottom wall 56 and biased upwardly in direction 34 by torsion spring 26 to close fuel-receiving passage 66 and provide a preferred blocker. Torsion spring 26 is coupled to torsion spring support 57 and includes a first leg 72 engaging torsion spring support 57 and a second leg 74 engaging door 24 to bias door 24 upwardly in direction 34. In alternative embodiments of the present invention, the torsion spring and door may be coupled to different structures.

Door 24 includes a coupling 76 coupled to bottom wall 56, a circular body member 78, and a ramp 79 coupled to circular body member 78 that extends into fuel-receiving passage 66 to minimize the volume of a drainage basin 83 defined by door 24 and nozzle guide 54. Circular body member 78 includes a circumferential sealing surface 80 that engages bottom side 64 of sealing lip 60 and second seal 30. Second seal 30 is coupled to one or both of bottom wall 56 and nozzle guide 54 as shown in FIGS. 2–7.

When a fuel-dispensing nozzle 14 is removed from filler neck 12, fuel-dispensing nozzle 14 often drips a small amount of liquid fuel 85 into filler neck closure 10 as shown in FIG. 2. Liquid fuel 85 is not able to enter fuel tank 11 because door 24 has closed and sealed against second seal 30.

Nozzle guide 54 is formed to include a drain hole 82 having a central axis 89. Drain hole 82 permits liquid fuel 85 to drain away from drainage basin 83 defined by door 24 and nozzle guide 54 so that liquid fuel 85 is drawn away from door 24 and into retention chamber 84 formed between nozzle guide 54, bottom wall 56, and outer side wall 52 as shown in FIGS. 2–7. Retention chamber 84 is one embodiment of a fuel retention chamber 125. In alternative embodiments, the fuel retention chamber may be in other locations.

Retention chamber 84 includes an inlet 87 through which liquid fuel 85 drips or runs through into retention chamber 84 as shown in FIG. 2. Inlet 87 provides a passage through which liquid fuel 85 that does not fall into nozzle guide 54 enters retention chamber 84. Inlet 87 is defined by nozzle guide 54, outer side wall 52, and ribs 58.

Drain hole 82 is one embodiment of a conductor that moves liquid fuel 85 from drainage basin 83 to retention chamber 84. Drain hole 82 permits gravity to move liquid fuel 85 from the drainage basin 83 door 24 to chamber 84. In alternative embodiments, the conductor may be any type of vacuum generator, pump, drain, or other device that aspirates, sucks, extracts, pushes, pumps, withdraws, or moves fuel from the area adjacent the door to the retention chamber.

When fuel-dispensing nozzle 14 is inserted into filler neck closure 10, fuel-dispensing nozzle 14 pushes door 24 in direction 86 against the bias of torsion spring 26 so that a portion of door 24 does not engage second seal 30 as shown in FIG. 4. This permits pressurized fuel vapor within filler neck 12 to flow past door 24 in direction 88 and through fuel-receiving passage 66 between fuel-dispensing nozzle 14 and nozzle guide 54 in direction 90 out of filler neck closure 10. Liquid fuel 85 in filler neck closure 10 does not spray out of filler neck closure 10 when pressurized vapor 91 flows out of filler neck closure 10 because liquid fuel 85 is stored in chamber 84 away from door 24 and shielded by nozzle guide 54.

After fuel-dispensing nozzle 14 is pushed further into filler neck 12 and begins dispensing liquid fuel 93 in direction 92, ambient air enters filler neck 12 in direction 94 between fuel-dispensing nozzle 14 and nozzle guide 54. The flow of ambient air between fuel-dispensing nozzle 14 and nozzle guide 54 creates a vacuum or negative pressure that aspirates liquid fuel 85 out of chamber 84 through drain hole 82 in direction 96 and down into filler neck 12. This vacuum empties chamber 84 so that there is room for liquid fuel 85 dripped into filler neck closure 10 as fuel-dispensing nozzle 14 is removed from filler neck 12.

The vacuum is one embodiment of a fuel remover 124 that moves liquid fuel 85 from chamber 84 into filler neck 12. In alternative embodiments, the conductor may be any type of vacuum generator, pump, drain, or other device that aspirates, sucks, extracts, pushes, pumps, withdraws, or moves fuel from the chamber to the filler neck.

Seal plate 20 cooperates with compression spring 22 and outer housing 18 to function as a pressure-relief valve as shown in FIG. 6. Compression spring 22 biases seal plate 20 downward in direction 32 so that seal plate 20 seals against first seal 28. Compression spring 22 permits seal plate 20 to move upward in direction 98 relative to outer housing 16 if excessive vapor pressure exists in filler neck 12 as shown in FIG. 6. The excessive pressurized fuel vapor 91 moves seal plate 20 upward in direction 98 against the bias of compression spring 22 so that fuel vapor may flow out of filler neck closure 10 between outer side wall 52 of seal plate 20 and outer housing 18 in direction 110 and through vent 40 formed in cover 16 in direction 112.

Torsion spring 26 cooperates with door 24 and seal plate 20 to function as a vacuum valve as shown in FIG. 7. If a vacuum condition exists in filler neck 12, ambient air is permitted to flow into filler neck closure 10 through vent 40 formed in cover 16 and push door 24 in direction 86 against the bias of torsion spring 26 so that the ambient air may flow past door 24 and into filler neck 12 in direction 114.

Outer housing 16 is also formed to include a nozzle-engaging ledge 116 as shown in FIGS. 2–7. Many fuel-dispensing nozzles 14 include collars 118 as shown in FIGS. 4 and 5. When fuel-dispensing nozzle 14 is inserted into filler neck 12, collar 116 is secured within filler neck 12 by the engagement between collar 118 and ledge 116 as shown in FIG. 5. In preferred embodiments, ledge 116 extends approximately 100 degrees about axis 120.

Features of this invention may be used in other closure assemblies including capless closure assemblies. Examples of capless closure assemblies are shown in U.S. Pat. No. 5,732,840 entitled "Closure Assembly For A Tank Filler Neck" and PCT Patent Application PCT/US98/02876 entitled "Seal For Filler Neck Closure Assembly", the disclosures of which are incorporated by reference herein.

Although the invention has been disclosed in detail with reference to certain preferred embodiments, variations and modifications exist within the scope and spirit of the invention.

What is claimed is:

1. A fuel tank filler apparatus comprising
    a fuel tank filler neck adapted to receive a fuel-dispensing nozzle introducing liquid fuel therein and to communicate the liquid fuel to a fuel tank,
    a pressure relief valve located within and coupled to the fuel tank filler neck, and
    a filler neck closure coupled to the fuel tank filler neck, the filler neck closure including a drainage basin configured to collect liquid fuel, a retention chamber configured to store liquid fuel, and a fuel conductor configured to communicate liquid fuel between the drainage basin and the retention chamber.

2. The fuel tank filler apparatus of claim 1, wherein the closure further includes a fuel-receiving passage and a blocker positioned to move between a normally closed position blocking the fuel-receiving passage and an opened position permitting liquid fuel to flow through the fuel-receiving passage to the fuel tank.

3. The fuel tank filler apparatus of claim 2, wherein the blocker defines a portion of the drainage basin.

4. The fuel tank filler apparatus of claim 2, wherein the retention chamber is spaced apart from the blocker.

5. The fuel tank filler apparatus of claim 2, wherein the blocker includes a body and a ramp coupled to the body to extend into the fuel-receiving passage adjacent to the conductor to define a portion of the drainage basin.

6. The fuel tank filler apparatus of claim 1, wherein the closure further includes a nozzle guide configured to guide a fuel-dispensing nozzle through the closure.

7. The fuel tank filler apparatus of claim 6, wherein the nozzle guide is tube-shaped and the closure further includes a cylindrical side wall positioned to surround the nozzle guide.

8. The fuel tank filler apparatus of claim 1, wherein the closure further includes an annular bottom wall extending between the side wall and the nozzle guide; and the nozzle guide, the side wall, and the bottom wall cooperate to define the retention chamber.

9. The fuel tank filler apparatus of claim 6, wherein the nozzle guide defines a portion of the drainage basin.

10. The fuel tank filler apparatus of claim 6, wherein the nozzle guide defines a portion of the retention chamber.

11. The fuel tank filler apparatus of claim 6, wherein the fuel conductor is formed in the nozzle guide.

12. The fuel tank filler apparatus of claim 6, wherein the closure further includes a side wall spaced apart from the nozzle guide that cooperates with the nozzle guide to define the retention chamber.

13. The fuel tank filler apparatus of claim 1, wherein the closure has a central axis and the conductor has a central axis that is non-orthogonal to the central axis of the closure.

14. A fuel tank filler apparatus comprising
    a fuel tank filler neck adapted to receive a fuel-dispensing nozzle introducing liquid fuel therein and to communicate the liquid fuel to a fuel tank and a filler neck closure coupled to the fuel tank filler neck, the filler neck closure including a drainage basin configured to collect liquid fuel, a retention chamber configured to store liquid fuel, and a fuel conductor configured to communicate liquid fuel between the drainage basin and the retention chamber, wherein the closure further includes a nozzle guide configured to guide a fuel-dispensing nozzle through the closure, a side wall spaced apart from the nozzle guide that cooperates with the nozzle guide to define the retention chamber, and a rib coupled to and extending between the side wall and the nozzle guide, the rib cooperating with the side wall and the nozzle guide to define the retention chamber.

15. A fuel tank filler apparatus comprising a fuel tank filler neck adapted to receive a fuel-dispensing nozzle introducing liquid fuel therein and to communicate the liquid fuel to a fuel tank, a pressure relief valve located within and coupled to the fuel tank filler neck, and a filler neck closure coupled to the fuel tank filler neck, the filler neck closure including a drainage basin configured to collect liquid fuel, a retention chamber configured to store liquid fuel, and means for conducting liquid fuel from the drainage basin to the retention chamber after removal of the fuel-dispensing nozzle from the fuel tank filler neck so that liquid fuel not introduced into the fuel tank is stored in a location separate from the drainage basin.

16. The fuel tank filler apparatus of claim 15, wherein the closure further includes a nozzle guide configured to guide a fuel-dispensing nozzle through the closure and the conducting means is a conductor formed in the nozzle guide.

17. The fuel tank filler apparatus of claim 16, wherein the nozzle guide is tube-shaped and the closure further includes a cylindrical side wall positioned to surround the nozzle guide.

18. The fuel tank filler apparatus of claim 16, wherein the nozzle guide defines a portion of the drainage basin.

19. The fuel tank filler apparatus of claim 16, wherein the nozzle guide defines a portion of the retention chamber.

20. The fuel tank filler apparatus of claim 16, wherein the closure further includes a side wall spaced apart from the nozzle guide that cooperates with the nozzle guide to define the retention chamber.

21. The fuel tank filler apparatus of claim 15, wherein the closure has a central axis and the conducting means has a central axis that is non-orthogonal to the central axis of the closure.

22. A fuel tank filler apparatus comprising a fuel tank filler neck adapted to receive a fuel-dispensing nozzle introducing liquid fuel therein and to communicate the liquid fuel to a fuel tank and a filler neck closure coupled to the fuel tank filler neck, the filler neck closure including a drainage basin configured to collect liquid fuel, a blocker positioned to pivot about a pivot axis between a normally closed position blocking the fuel-receiving passage and an opened position permitting liquid fuel to flow through fuel-receiving passage to the fuel tank, a retention chamber configured to store liquid fuel, and means for conducting liquid fuel from the retention chamber to the fuel tank using negative pressure created during introduction of liquid fuel into the fuel tank filler neck by the fuel-dispensing nozzle so that liquid fuel stored in the retention chamber is communicated to the fuel tank, wherein the conducting means is positioned at an end of the blocker opposite the pivot axis.

23. The fuel tank filler apparatus of claim 22, wherein the closure further includes a nozzle guide configured to guide a fuel-dispensing nozzle through the closure and the conducting means is a conductor formed in the nozzle guide.

24. The fuel tank filler apparatus of claim 23, wherein the nozzle guide is tube-shaped and the closure further includes a cylindrical side wall positioned to surround the nozzle guide.

25. The fuel tank filler apparatus of claim 24, wherein the nozzle guide defines a portion of the drainage basin.

26. The fuel tank filler apparatus of claim 23, wherein the nozzle guide defines a portion of the retention chamber.

27. The fuel tank filler apparatus of claim 23, wherein the closure further includes a side wall spaced apart from the nozzle guide that cooperates with the nozzle guide to define the retention chamber.

28. The fuel tank filler apparatus of claim 22, wherein the closure has a central axis and the conducting means has a central axis that is non-orthogonal to the central axis of the closure.

29. A fuel tank filler apparatus comprising a fuel tank filler neck adapted to receive a fuel-dispensing nozzle introducing liquid fuel therein and to communicate the liquid fuel to a fuel tank and a filler neck closure coupled to the fuel tank filler neck, the filler neck closure including a drainage basin configured to collect liquid fuel, a retention chamber configured to store liquid fuel, a fuel-receiving passage, a blocker positioned to pivot about a pivot axis between a normally closed position blocking the fuel-receiving passage and an opened position permitting liquid fuel to flow through the fuel-receiving passage to the fuel tank, and means for communicating liquid fuel to the retention chamber after removal of the fuel-dispensing nozzle from the fuel tank filler neck so that liquid fuel not introduced to the fuel tank is stored in the retention chamber at a location separate from the drainage basin and aspirating the liquid fuel stored in the retention chamber to the filler neck using negative pressure created during introduction of liquid fuel into the fuel tank filler neck by the fuel-dispensing nozzle so that liquid fuel stored in the retention chamber is communicated to the fuel tank, wherein the communicating means is positioned at an end of the blocker opposite the pivot axis.

30. The fuel tank filler apparatus of claim 29, wherein the closure further includes a nozzle guide configured to guide a fuel-dispensing nozzle through the closure and the communicating and aspirating means is a conductor formed in the nozzle guide.

31. The fuel tank filler apparatus of claim 30, wherein the nozzle guide is tube-shaped and the closure further includes a cylindrical side wall positioned to surround the nozzle guide.

32. The fuel tank filler apparatus of claim 30, wherein the nozzle guide defines a portion of the drainage basin.

33. The fuel tank filler apparatus of claim 30, wherein the nozzle guide defines a portion of the retention chamber.

34. The fuel tank filler apparatus of claim 30, wherein the closure further includes a side wall spaced apart from the nozzle guide that cooperates with the nozzle guide to define the retention chamber.

35. The fuel tank filler apparatus of claim 29, wherein the closure has a central axis and the conducting and aspirating means has a central axis that is non-orthogonal to the central axis of the closure.

36. A fuel tank filler apparatus comprising a fuel tank filler neck adapted to receive a fuel-dispensing nozzle introducing liquid fuel therein and to communicate the liquid fuel to a fuel tank, a pressure relief valve located within and coupled to the fuel tank filler neck, and a filler neck closure coupled to the fuel tank filler neck, the filler neck closure including a retention chamber configured to store liquid fuel, a fuel conductor configured to communicate liquid fuel from the retention chamber to the fuel tank, and an inlet into the retention chamber configured to introduce liquid fuel into the retention chamber, the inlet being spaced apart from the fuel conductor.

37. The fuel tank filler apparatus of claim 36, wherein the closure further includes a fuel-receiving passage and a blocker positioned to move between a normally closed position blocking the fuel-receiving passage and an opened position permitting liquid fuel to flow through fuel-receiving passage to the fuel tank.

38. The fuel tank filler apparatus of claim 37, wherein the blocker is spaced apart from the inlet.

39. The fuel tank filler apparatus of claim 37, wherein the retention chamber is spaced apart from the blocker.

40. The fuel tank filler apparatus of claim 36, wherein the closure further includes a nozzle guide configured to guide a fuel-dispensing nozzle through the closure.

41. The fuel tank filler apparatus of claim 40, wherein the nozzle guide is tube-shaped and the closure further includes a cylindrical side wall positioned to surround the nozzle guide.

42. The fuel tank filler apparatus of claim 41, wherein the nozzle guide and the side wall cooperate to define the inlet.

43. The fuel tank filler apparatus of claim 40, wherein the nozzle guide defines a portion of the retention chamber.

44. The fuel tank filler apparatus of claim 40, wherein the fuel conductor is formed in the nozzle guide.

45. The fuel tank filler apparatus of claim 40, wherein the closure further includes a side wall spaced apart from the nozzle guide that cooperates with the nozzle guide to define the retention chamber.

46. The fuel tank filler apparatus of claim 36, wherein the closure has a central axis and the conductor has a central axis that is non-orthogonal to the central axis of the closure.

47. The fuel tank filler apparatus of claim 36, wherein the closure further includes a drainage basin configured to collect liquid land spaced apart from the inlet.

48. A fuel tank filler apparatus comprising a fuel tank filler neck adapted to receive a fuel-dispensing nozzle introducing liquid fuel therein and to communicate the liquid fuel to a fuel tank and a filler neck closure coupled to the fuel tank filler neck, the filler neck closure including a retention chamber configured to store liquid fuel, a fuel conductor configured to communicate liquid fuel from the retention chamber to the fuel tank, and an inlet into the retention chamber configured to introduce liquid fuel into the retention chamber, the inlet being spaced apart from the fuel conductor wherein the closure further includes a nozzle guide configured to guide a fuel-dispensing nozzle through the closure, a side wall spaced apart from the nozzle guide that cooperates with the nozzle guide to define the retention chamber, and a rib coupled to and extending between the side wall and the nozzle guide, the rib cooperating with the side wall and the nozzle guide to define the retention chamber.

49. The fuel tank filler apparatus of claim 1, wherein the fuel conductor is further configured to aspirate the liquid fuel stored in the retention chamber to the filler neck using negative pressure created during introduction of liquid fuel into the fuel tank filler neck by the fuel-dispensing nozzle so that liquid fuel stored in the retention chamber is communicated to the fuel tank.

50. A fuel tank filler apparatus comprising a fuel tank filler neck adapted to receive a fuel-dispensing nozzle introducing liquid fuel therein and to communicate the liquid fuel to a fuel tank and a filler neck closure coupled to the fuel tank filler neck, the filler neck closure including a retention chamber configured to store liquid fuel, a fuel-receiving passage, a blocker positioned to pivot about a pivot axis between a normally closed position blocking the fuel-receiving passage and an opened position permitting liquid fuel to flow through the fuel-receiving passage to the fuel tank, a fuel conductor configured to communicate liquid fuel from the retention chamber to the fuel tank, and an inlet into the retention chamber configured to introduce liquid fuel into the retention chamber, the inlet being spaced apart from the fuel conductor, wherein the fuel conductor is positioned at an end of the blocker opposite the pivot axis.

51. The fuel tank filler apparatus of claim 50, wherein the blocker is spaced apart from the inlet.

52. The fuel tank filler apparatus of claim 50, wherein the retention chamber is spaced apart from the blocker.

53. The fuel tank filler apparatus of claim 50, wherein the closure further includes a nozzle guide configured to guide a fuel-dispensing nozzle through the closure.

54. The fuel tank filler apparatus of claim 53, wherein the nozzle guide is tube-shaped and the closure further includes a cylindrical side wall positioned to surround the nozzle guide.

55. The fuel tank filler apparatus of claim 54, wherein the nozzle guide and the side wall cooperate to define the inlet.

56. The fuel tank filler apparatus of claim 55, wherein the nozzle guide defines a portion of the retention chamber.

57. The fuel tank filler apparatus of claim 53, wherein the fuel conductor is formed in the nozzle guide.

58. The fuel tank filler apparatus of claim 53, wherein the closure further includes a side wall spaced apart from the nozzle guide that cooperates with the nozzle guide to define the retention chamber.

59. The fuel tank filler apparatus of claim 50, wherein the closure has a central axis and the conductor has a central axis that is non-orthogonal to the central axis of the closure.

60. The fuel tank filler apparatus of claim 50, wherein the closure further includes a drainage basin configured to collect liquid fuel and spaced apart from the inlet.

\* \* \* \* \*